(12) United States Patent
Otten et al.

(10) Patent No.: US 12,003,580 B2
(45) Date of Patent: Jun. 4, 2024

(54) TECHNIQUES FOR UPDATING FILES

(71) Applicant: Valve Corporation, Bellevue, WA (US)

(72) Inventors: Martin Otten, Bellevue, WA (US);
Taylor Sherman, Seattle, WA (US);
Henry Goffin, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 337 days.

(21) Appl. No.: 17/358,759

(22) Filed: Jun. 25, 2021

(65) Prior Publication Data

US 2021/0329071 A1 Oct. 21, 2021

Related U.S. Application Data

(63) Continuation of application No. 16/262,431, filed on Jan. 30, 2019, now Pat. No. 11,070,618.

(51) Int. Cl.
*G06F 17/00* (2019.01)
*G06F 16/13* (2019.01)
(Continued)

(52) U.S. Cl.
CPC .......... *H04L 67/1097* (2013.01); *G06F 16/13* (2019.01); *G06F 16/1744* (2019.01);
(Continued)

(58) Field of Classification Search
CPC ........ G06F 16/13; G06F 16/24; G06F 16/156; G06F 16/178; G06F 11/002; G06F 11/1446; G06N 3/00; G06N 5/00; G05B 13/00
See application file for complete search history.

(56) References Cited

U.S. PATENT DOCUMENTS 5,822,511 A 10/1998 Kashyap et al.
6,216,175 B1 4/2001 Sliger et al.
(Continued)

FOREIGN PATENT DOCUMENTS

JP 2004514214 A 5/2004
JP 2004287705 A 10/2004
(Continued)

OTHER PUBLICATIONS

PCT Search Report & Written Opinion for PCT App No. PCT/US21/70545, dated Aug. 31, 2021, 12 pages.
(Continued)

*Primary Examiner* — Hung D Le
(74) *Attorney, Agent, or Firm* — Lee & Hayes, P.C.

(57) ABSTRACT

The application is directed to techniques, devices, and systems for updating files. For example, a remote system may store first data representing a first version of a file and second data representing a second version of the file. The remote system may then determine that a first portion of the first data corresponds to a first portion of the second data. Based at least in part on the determination, the remote system may identify a second portion of the first data using the first portion of the first data and identify a second portion of the second data using the first portion of the second data. The remote system may then generate third data representing a difference between the second portion of the second data and the second portion of the first data. Additionally, the remote system may store the third data in association with the file.

20 Claims, 7 Drawing Sheets

(51) Int. Cl.
*G06F 16/174* (2019.01)
*G06F 16/18* (2019.01)
*H04L 67/06* (2022.01)
*H04L 67/1097* (2022.01)
*H04L 69/04* (2022.01)

(52) U.S. Cl.
CPC .......... *G06F 16/1873* (2019.01); *H04L 67/06* (2013.01); *H04L 69/04* (2013.01)

(56) References Cited

U.S. PATENT DOCUMENTS

| | | | |
|---|---|---|---|
| 6,493,721 | B1* | 12/2002 | Getchius ............... G06Q 30/02 |
| 7,320,009 | B1 | 1/2008 | Srivastava et al. |
| 7,640,363 | B2 | 12/2009 | Teodosiu et al. |
| 7,664,819 | B2* | 2/2010 | Murphy ............... G06Q 10/107 |
| | | | 709/219 |
| 8,761,496 | B2* | 6/2014 | Kokumai ................ H04N 5/91 |
| | | | 382/218 |
| 8,862,555 | B1* | 10/2014 | Xu ..................... G06F 16/1756 |
| | | | 707/687 |
| 8,996,659 | B2 | 3/2015 | Werth et al. |
| 9,753,987 | B1* | 9/2017 | Dolan ................... G06F 16/182 |
| 9,773,042 | B1* | 9/2017 | Li ......................... G06F 16/1756 |
| 9,934,301 | B2* | 4/2018 | Srivastava .......... G06F 16/1844 |
| 2003/0182414 | A1 | 9/2003 | O'Neill |
| 2003/0212712 | A1 | 11/2003 | Gu et al. |
| 2004/0034849 | A1* | 2/2004 | Cohen ................ G06F 9/44505 |
| | | | 717/120 |
| 2005/0010863 | A1* | 1/2005 | Zernik .................. G06F 40/131 |
| | | | 715/229 |
| 2007/0192474 | A1 | 8/2007 | Decasper et al. |
| 2007/0226320 | A1 | 9/2007 | Hager et al. |
| 2010/0001886 | A1* | 1/2010 | Bellessort ........... H03M 7/3084 |
| | | | 341/51 |
| 2010/0191774 | A1 | 7/2010 | Mason, Jr. et al. |
| 2011/0145313 | A1 | 6/2011 | Narayanan et al. |
| 2013/0013874 | A1* | 1/2013 | Graefe ................ G06F 11/1469 |
| | | | 711/E12.103 |
| 2013/0103664 | A1* | 4/2013 | Heidasch .............. G06F 16/334 |
| | | | 707/706 |
| 2013/0304711 | A1 | 11/2013 | Resch |
| 2014/0006461 | A1* | 1/2014 | Estes ..................... G06F 40/194 |
| | | | 707/821 |
| 2014/0101096 | A1* | 4/2014 | Pfeifle ..................... G06F 16/29 |
| | | | 707/609 |
| 2014/0250066 | A1 | 9/2014 | Calkowski et al. |
| 2015/0012528 | A1* | 1/2015 | Kapadia ................ G06F 40/169 |
| | | | 707/758 |
| 2015/0169995 | A1* | 6/2015 | Panferov .............. G06V 30/414 |
| | | | 382/220 |
| 2015/0205695 | A1* | 7/2015 | Sengupta ............ G06F 11/3409 |
| | | | 707/688 |
| 2015/0286668 | A1 | 10/2015 | Legler |
| 2016/0132576 | A1* | 5/2016 | Qi ........................... G06F 16/27 |
| | | | 707/600 |
| 2016/0147457 | A1* | 5/2016 | Legler ................... G06F 3/0605 |
| | | | 707/601 |
| 2016/0147804 | A1* | 5/2016 | Wein .................... G06F 16/2264 |
| | | | 707/600 |
| 2016/0212448 | A1* | 7/2016 | Wang ...................... H04N 19/86 |
| 2017/0046234 | A1* | 2/2017 | Yang .................... G06F 16/2365 |
| 2017/0060480 | A1 | 3/2017 | Gray et al. |
| 2017/0147225 | A1* | 5/2017 | Geissinger ............ G06F 16/221 |
| 2017/0147324 | A1 | 5/2017 | Weber et al. |
| 2017/0193230 | A1* | 7/2017 | Jevnisek ............... G06F 21/564 |
| 2017/0364603 | A1* | 12/2017 | Gabrys ................. G06F 16/273 |
| 2018/0089155 | A1* | 3/2018 | Baron ..................... G06F 16/93 |
| 2018/0260985 | A1* | 9/2018 | Ding ..................... G06T 11/206 |
| 2018/0307478 | A1* | 10/2018 | Norris ..................... G06F 9/505 |
| 2019/0147067 | A1 | 5/2019 | Rigor |
| 2020/0026524 | A1* | 1/2020 | Roland ................. G06F 3/0617 |
| 2020/0117893 | A1* | 4/2020 | Whelan ................ G06V 30/418 |
| 2020/0244731 | A1 | 7/2020 | Otten et al. |
| 2020/0349126 | A1 | 11/2020 | Landman |

FOREIGN PATENT DOCUMENTS

| | | |
|---|---|---|
| JP | 2008204287 A | 9/2008 |
| JP | 2012069131 A | 4/2012 |

OTHER PUBLICATIONS

Extended European Search Report dated May 20, 2022 for European Patent Application No. 19912771.3, 12 pages.
Office Action for U.S. Appl. No. 16/874,234, dated Jun. 3, 2022, Sherman, "Efficient File-Delivery Techniques", 27 pgaes.
Charles Bloom "Sep. 23, 2012—Patches and Deltas", retrived on Jan. 25, 2019 at <<https://cbloomrants.blogspot.com/2012/09/09-23-12-patches-and-deltas.html>>, 8 pages.
Office Action for U.S. Appl. No. 16/245,049, dated Sep. 25, 2020, Sherman, "Delivery of Digital Information to a Remote Device", 16 Pages.
Office Action for U.S. Appl. No. 16/262,431, dated Nov. 13, 2020, Otten, "Techniques for Updating Files ", 33 Pages.
PCT Search Report and Written Opinion dated Mar. 25, 2020 for PCT Application No. PCT/US19/68488, 10 pages.
Office Action for U.S. Appl. No. 17/396,348, dated Nov. 17, 2022, Sherman, "Delivery of Digital Information to a Remote Device", 13 Pages.
Office Action for U.S. Appl. No. 16/874,234, dated Dec. 14, 2022, Sherman, Efficient File-Delivery Techniques, 26 pages.
European Office Action dated Dec. 6, 2023 for European Application No. 19912771.3, a foreign counterpart to U.S. Pat. No. 11,070,618, 13 pages.
Japanese Office Action dated Dec. 12, 2023 for Japanese Application No. 2021-544198, a foreign counterpart to U.S. Pat. No. 11,070,618, 6 pages.

* cited by examiner

500

502 — STORE FIRST DATA REPRESENTING A FIRST VERSION OF A FILE

504 — STORE SECOND DATA REPRESENTING A SECOND VERSION OF THE FILE

506 — DETERMINE THAT A FIRST PORTION OF THE FIRST DATA CORRESPONDS TO A FIRST PORTION OF THE SECOND DATA

508 — IDENTIFY A SECOND PORTION OF THE FIRST DATA USING THE FIRST PORTION OF THE FIRST DATA

510 — IDENTIFY A SECOND PORTION OF THE SECOND DATA USING THE FIRST PORTION OF THE SECOND DATA

512 — GENERATE THIRD DATA REPRESENTING A DIFFERENCE BETWEEN THE SECOND PORTION OF THE SECOND DATA AND THE SECOND PORTION OF THE FIRST DATA

514 — STORE THE THIRD DATA IN ASSOCIATION WITH THE FILE

FIG. 5

TECHNIQUES FOR UPDATING FILES

CROSS REFERENCE TO RELATED APPLICATION

This U.S. patent application is a continuation of and claims priority to co-pending and commonly assigned U.S. patent application Ser. No. 16/262,431, entitled "TECHNIQUES FOR UPDATING FILES," and filed on Jan. 30, 2019, the entirety of which is incorporated herein by reference.

BACKGROUND

A remote system may send files to electronic devices over networks, such as the Internet. At times, developers of these files may update these files and provide updated versions to the remote system. These updated files may then be provided to the electronic devices, either in response to requests from the devices or otherwise. However, as files have grown in complexity and size, sending the updated files to the electronic devices may require a great amount of network bandwidth and may take a relatively long amount of time to be stored on these devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 is a flowchart of a first example process for identifying a portion of first data that is similar to a portion of second data.

DETAILED DESCRIPTION

Figure 1:
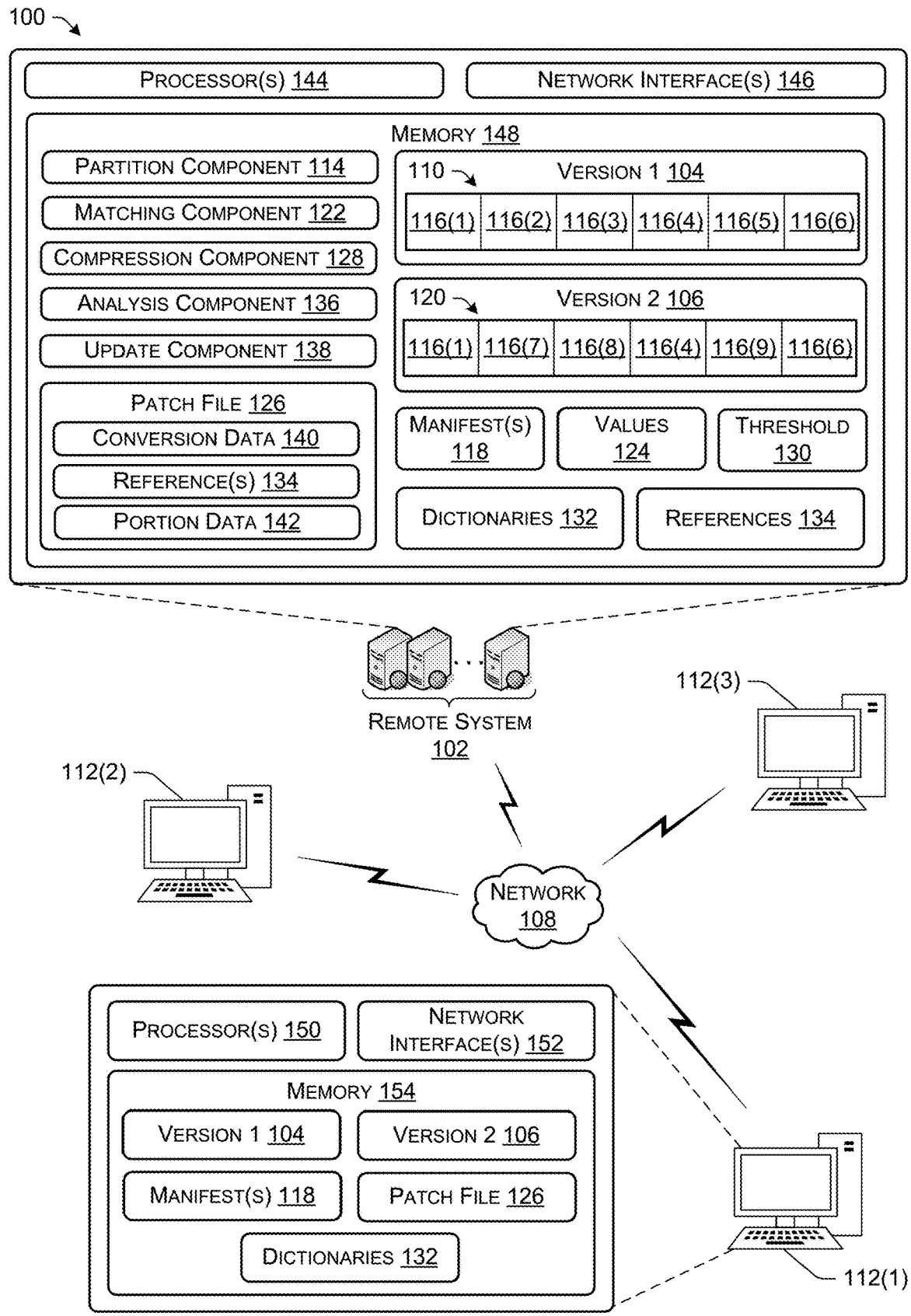
FIG. 1 is a diagram illustrating an example environment that includes a remote system configured to generate a patch fie for updating a file from a first version of the file to a second version of the file.

Described herein are, among other things, techniques, devices, and systems for efficiently updating files. For example, a remote system may generate, receive, and/or store data (referred to, in this example, as "first data") representing a first version of a file. The file may represent a game, a video, a document, and/or the like. In some instances, the file may be provided to the remote system by a third party, such as a game developer or the like. Thereafter, the remote system may receive a request for the file from one or more electronic devices, such as personal computers, laptop computers, game consoles, tablet computers, or the like. In response, the remote system may send the first data, representative of the first version of the file, to one or more electronic devices. In some examples, to send the first data, the remote system may first partition the first data into contiguous portions, such as one megabyte portions. After partitioning the first data, the remote system may send the portions to the electronic devices one at a time. In some instances, the remote system may additionally send a manifest to the one or more electronic devices, with the manifest defining an order for reassembling the portions of the first data on the electronic devices to generate the first version of the file. Upon receiving the manifest and each of the portions of the first data, the electronic devices may generate the first versions of the file such that the devices may execute or otherwise render respective instances of the file.

Later, the remote system may generate, receive, and/or store data (referred to, in this example, as "second data") representing a second, updated version of the file. To generate the second data, the developer of the file may have added, removed, and/or changed data from the first version of the file. The remote system may then send the second data to the one or more electronic devices, which the one or more electronic devices may use to update the first version of the file to the second version of the file. In some examples, in order to save computing resources, such as network bandwidth, the remote system may send a portion of the second data to the one or more electronic devices. The one or more electronic devices may then use the portion of the second data to "patch" the first data in order to update the first version of the file to the second version of the file. In some instances, this patch file is pushed to electronic devices that store the first version of the file, while in other instances the patch file is sent to the electronic devices in response to the remote system receiving respective requests from these devices.

In order to generate a patch file, the remote system may begin by partitioning portions of the second data into contiguous portions, which may be of the of the same or similar size of the contiguous portions of the first data (e.g., one megabyte). The remote system may then analyze the portions of the first data with respect to the portions of the second data to identify similarities between portion(s) of the first data and portion(s) of the second data. For instance, the remote system may "walk through" the second data to identify matching portions, such as a portion of the first data that matches a portion of the second data.

In some examples, to analyze the portions of the first data with respect to the portions of the second data, the remote system may fingerprint or tag the portions. For a first example, the remote system may utilize cyclic redundancy check (CRC) to generate first check values associated with the portions of the first data and second check values associated with the portions of the second data. The remote system may then compare the first check values to the second check values to identify first check value(s) that match the second check value(s). Based on identifying match(es), the remote system may identify portion(s) of the first data that correspond to (e.g., include the same data as) portion(s) of the second data. For a second example, the remote system may utilize Secure Hash Algorithm 1 (SHA-1) to generate first hash values associated with the portions of the first data and second hash values associated with the portions of the second data. The remote system may then compare the first hash values to the second hash values to identify first hash value(s) that match the second hash value(s). Based on the matches, the remote system may identify portion(s) of the first data that correspond to portion(s) of the second value. Of course, while a few example techniques for identifying matching portions are described, it is to be appreciated that the remote system may utilize any other technique to identify such matching portions.

In some examples, the remote system may then store unique portion(s) of the second data (e.g., portion(s) of the second data that do not correspond to portions of the first data). Additionally, the remote system may generate a manifest that indicates an order for reassembling the second version of the file using some portions of the first version of the file and the portions of the second version of the file that are new or unique to the second version. Stated otherwise, the manifest may define an order for reassembling (1) the portion(s) of the first data that correspond to portion(s) of the second data and (2) the unique portion(s) of the second data. The remote system may then send, to the one or more electronic devices, the unique portion(s) of the second data along with the manifest for reassembling the second version of the file. The one or more electronic devices may then use the portion(s) of the first data that correspond to the portion(s) of the second data, which are stored on the one or more electronic devices, the received unique portion(s) of the second data, and the manifest to reassemble the second version of the file. As such, in some examples, instead of sending the one or more electronic devices the entirety of the second data, the remote system may send the unique portion(s) of the second data along with the manifest. This may reduce network bandwidth and lessen the amount of time it takes to update a client device from a first version of the file to the second version of the file.

In some examples, a unique portion of the second data may be similar enough to a portion of the first data that the unique portion of the second data can be converted to the portion of the first data with minimal instructions. For example, the difference between the unique portion of the second data and the portion of the first data may include one or more bytes of data that were added to, removed from, or changed within the portion of the first data. As such, before and/or instead of sending unique portion(s) of the second data to the one or more electronic devices, the remote system may initially determine whether the unique portion(s) can be converted to one of the portions of the first data. Based on determining that a unique portion of the second data can be converted to a portion of the first data, the remote system may generate data representing instructions for converting the unique portion of the second data into the portion of the first data. The remote system may then perform a similar process for other unique portion(s) that can be converted to portions of the first data. Using this data, the remote system may generate a patch file and send the patch file to the one or more electronic devices.

For example, the remote system may identify that a first portion of the first data corresponds to a first portion of the second data, using the processes described above. The remote system may then use the similarity to identify a second portion (e.g., unique portion) of the second data that may converted to a second portion of the first data. In some examples, the remote system identifies the second portion of the second data as a "neighbor" to the first portion of the second data and identifies the second portion of the first data as a "neighbor" to the first portion of the first data. For a first example, the second portion of the second data may include the portion of the second data that precedes the first portion of the second data, and the second portion of the first data may include the portion of the first data that precedes the first portion of the first data. For a second example, the second portion of the second data may include the portion of the second data that is subsequent to the first portion of the second data, and the second portion of the first data may include the portion of the first data that is subsequent to the first portion of the first data.

The remote system may then generate data representing a difference between the second portion of the second data and the second portion of the first data. Based on determining that the difference does not satisfy a threshold difference, the remote system may determine that the second portion of the second data is not similar to the second portion of the first data. However, based on determining that the difference satisfies the threshold difference, the remote system may determine that the second portion of the second data is similar to the second portion of the first data. The remote system may then store the data representing the difference as at least part of the patch file for the second version of the file.

In some examples, the remote system may use compression to determine if the second portion of the second data is similar to the second portion of the first data. For example, the remote system may use one or more algorithm(s) (e.g., Lempel-Ziv-Markov chain algorithm (LZMA)), Lempel-Ziv-Welch (LZW), British Telecom Lempel Ziv (BTLZ), LZ77, LZ78 etc.) to compress the second portion of the first data. Based on the compression, the remote system may generate first compressed data for the second portion of the first data. The remote system may further use the algorithm(s) to compress the second portion of the second data. Based on the compression, the remote system may generate second compressed data for the second portion of the second data. Additionally, the remote system may use the algorithm(s) and the first compressed data to again compress the second portion of the second data. For instance, the remote system may use the first compressed data as a base to generate the third compressed data, where the third compressed data represents a difference between the second portion of the first data and the second portion of the second data.

The remote system may then determine a difference between second compressed data and the third compressed data. The remote system may then determine if the difference satisfies a threshold difference. For a first example, the remote system may determine a size difference between the second compressed data the third compressed data. The remote system may then determine if the size difference satisfies a size threshold. For instance, if the size difference is 0.5 megabytes, and the size threshold is 0.75 megabytes, then the remote system may determine that the size difference satisfies (e.g., is within) the size threshold. For a second example, the remote system may determine a ratio (e.g., a difference) of the size of the third compressed data to the size to the second compressed data. The remote system may then determine if the ratio satisfies a threshold. For instance, if the second compressed data includes a size of 0.5 megabytes and the third compressed data includes a size of 0.8 megabytes, then the remote system may determine that the ratio of the size of the second compressed data to the size of the second compressed data is 0.625. If the threshold includes 0.8, then the remote system may determine that the ratio satisfies (e.g., is within) the threshold. For example, the remote system may determine that the ratio of 0.625 is within (e.g., less than) the threshold of 0.8. In some examples, the smaller the ratio, the more similar the second portion of the second data is to the second portion of the first data.

In some examples, the compressed data may include a dictionary and/or a reference. For example, the remote system may use the algorithm(s) to compress the second portion of the first data. Based on the compression, the remote system may generate a first dictionary and a first reference (e.g., a first sequence of symbols and phrase references). The remote system may further use the algorithm(s) to compress the second portion of the second data. Based on the compression, the remote system may generate a second dictionary and a second reference (e.g., a second sequence of symbols and phrase references). Additionally, the remote system may use the algorithm(s) and the first dictionary to again compress the second portion of the second data. For instance, the remote system may use the first dictionary as a base to generate a third dictionary and/or a third reference (e.g., a third sequence of symbols and phrase references), where the third dictionary and/or the third reference represents a difference between the second portion of the first data and the second portion of the second data.

For instance, in some examples, if the second portion of the second data and the second portion of the first data have a high degree of similarity, such as differing by a few bytes of data, then the third dictionary and/or the third reference will be deemed similar to the first dictionary and/or the third reference. Additionally, if the second portion of the second data and the second portion of the first data are not similar, then the third dictionary and/or the third reference will not be deemed similar to the first dictionary and/or the first reference.

The remote system may then determine a difference between second dictionary and the third dictionary. The remote system may then determine if the difference satisfies a threshold difference. For a first example, the remote system may determine a size difference between the second dictionary and the third dictionary. The remote system may then determine if the size difference satisfies a size threshold. For instance, if the size difference is 0.5 megabytes, and the size threshold is 0.75 megabytes, then the remote system may determine that the size difference satisfies (e.g., is within) the size threshold. For a second example, the remote system may determine a ratio (e.g., a difference) of the size of the third dictionary to the size to the second dictionary. The remote system may then determine if the ratio satisfies a threshold. For instance, if the second dictionary includes a size of 0.5 megabytes and the third dictionary includes a size of 0.8 megabytes, then the remote system may determine that the ratio of the size of the second dictionary to the size of the second dictionary is 0.625. If the threshold includes 0.8, then the remote system may determine that the ratio satisfies (e.g., is within) the threshold. For example, the remote system may determine that the ratio of 0.625 is within (e.g., less than) the threshold of 0.8. In some examples, the smaller the ratio, the more similar the second portion of the second data is to the second portion of the first data.

In some examples, based on determining that the difference satisfies the threshold, the remote system may store the data representing the difference (e.g., at least a portion of the third compressed data, at least a portion of the third dictionary that differs from the first dictionary and/or the third reference, etc.) as part of the patch file for the second version of the file. Additionally, the remote system may perform similar processes to generate additional data representing difference(s) for one or more other portion(s) of the second data that the remote systems determines to be similar to portions of the first data. The remote system may then store the additional data as part on the patch file. In some examples, the remote system may then send, to the one or more electronic devices, the patch file instead of the unique portion(s) of the second data that the remote system determined to be similar to the portion(s) of the first data. By sending the patch file, the remote system may further save computing resources, such as network bandwidth.

In some examples, the remote system may perform similar processes for updating other versions of the file. For instance, the remote system may store data (referred to, in this example, as "third data") representing a third version of the file. The remote system may then identify portion(s) of the third data that correspond to portions(s) of the second data, generate patch fil(s) for unique portion(s) of the third data that are found to be similar to portion(s) for the second data, and identify portion(s) of the third data that are not similar to portion(s) of the second data. The remote system may then send, to the one or more electronic devices, the patch file(s) for unique portion(s) of the third data that are found to be similar to portion(s) for the second data and the portion(s) of the third data that are not similar to portion(s) of the second data.

In some examples, where there are numerous versions of a file, the remote system may perform the processes above for one or more pairs of the versions of the file. For a first example, if there are four versions of the file, the remote system may perform the processes above for updating the first version to the second version, the first version to the third version, the first version to the fourth version, the second version to the third version, the second version to the fourth version, and/or the third version to the fourth version. For a second example, the remote system may perform the processes above for the most popular updates. For instance, if one electronic device updates the first version to the fourth version and fifty electronic devices update the third version to the fourth version, the remote system may perform the processes above for updating the third version of the fourth version, but the remote system may not perform the processes above for updating the first version to the fourth version.

It should be noted that, in some examples, when analyzing an identified portion of the second data with respect to an identified of the first data, the remote system may determine that the identified portion of the second data is similar to the identified portion of the first data. In such examples, the remote system may then determine that the identified portion of the second data corresponds to the identified portion of the first data. Additionally, the remote system may perform the processes described above using the "neighbors" of the identified portion of the second data and the identified portion of the first data.

In some examples, by performing the processes described above (e.g., using matching portion(s)), the remote system is able to more easily identify portion(s) of the first data that may correspond to portion(s) of the second data. This may reduce the need for the remote system to analyze each portion of the first data to each portion of the second data, which may reduce the amount of processing that is performed by the remote system. As such, by performing the processes described above, the remote system may require less computing resources when processing the first data and the second data.

FIG. 1 is a diagram illustrating an example environment 100 that includes a remote system 102 configured to generate a patch file for updating a file from a first version 104 of the file to a second version 106 of the file. In some examples, the file may correspond to a game. For instance, the first version 104 of the file may correspond to a first version of the game and the second version 106 of the file may correspond to an updated, second version of the game.

In other examples, the file may correspond to an application, a program, a document, a video, an image, and/or the like. In some examples, the remote system 102 may receive the first version 104 of the file and/or the second version 106 from one or more computing devices associated with a developer of the file.

At a first time, the remote system 102 may send, over the network 108, first data 110 representing the first version 104 of the file to one or more electronic devices, such as a first electronic device 112(1), a second electronic device 112(2), and a third electronic device 112(3). While only three electronic devices 112(1)-(3) are illustrated for clarify purposes, in other example, the remote system 102 may send the first data 110 to any number of electronic devices.

In some examples, to send the first data 110 to the electronic device(s) 12(1)-(3), the remote system 102 may utilize a partition component 114 to identify portions 116 (1)-(6) of the first data 110. The portions 116(1)-(6) may include contiguous sections of the first data 110. In some examples, the portions 116(1)-(6) of the first data 110 may include any size. For example, the portions 116(1)-(6) may include, but are not limited to, 500 Byte contiguous sections of the first data 110, 1 megabyte contiguous sections of the first data 110, 5 megabyte contiguous sections of the first data 110, and/or the like. The remote system 102 may then send the portions 116(1)-(6) of the first data 110 to the electronic devices 112(1)-(3). Additionally, in some examples, the remote system 102 may send data representing a manifest 118 to the electronic devices 112(1)-(3). The manifest 118 may define an order for reassembling the portions 116(1)-(6) of the first data 110 on the electronic devices 112(1)-(3) in order to generate the first version 104 of the file.

Later, the remote system 102 may generate, receive, and/or store second data 120 representing the second version 106 of the file. To generate the second data 120, data may have been added to the first data 110, removed from the first data 110, changed within the first data 110, and/or the like. Using the first data 110 and the second data 120, the remote system 102 may generate a patch for updating the first version 104 of the file to the second version 106 of the file on the electronic devices 112(1)-(3). For example, the remote system 102 may utilize the partition component 114 identify portions 116(1), 116(4), 116(6), and 116(7)-(9) of the second data 120. The portions 116(1), 116(4), 116(6), and 116(7)-(9) may include contiguous sections of the second data. In some examples, the portions 116(1), 116(4), 116(6), and 116(7)-(9) of the second data 120 may include any size. For example, the portions 116(1), 116(4), 116(6), and 116(7)-(9) may include, but are not limited to, 500 Byte contiguous sections of the first data 110, 1 megabyte contiguous sections of the first data 110, 5 megabyte contiguous sections of the first data 110, and/or the like.

The remote system 102 may then utilize a matching component 122 to analyze the portions 116(1)-(6) of the first data 110 with respect to the portions 116(1), 116(4), 116(6), and 116(7)-(9) of the second data 120 to identify similarities between portion(s) of the first data 110 and portion(s) of the second data 120. In some examples, to perform the analysis, the matching component 122 may fingerprint or tag the portions 116(1)-(9). For a first example, the matching component 122 may utilize CRC to generate first check values 124 associated with the portions 116(1)-(6) of the first data 110 and second check values 124 associated with the portions 116(1), 116(4), 116(6), and 116(7)-(9) of the second data 120. The matching component 122 may then compare the first check values 124 to the second check values 124 to identify portion(s) of the first data 110 that correspond to (e.g., include the same data as) portion(s) of the second data 120.

For instance, and as shown in the example of FIG. 1, the matching component 122 may determine that the check value 124 associated with the portion 116(1) of the first data 110 matches the check value 124 associated with the portion 116(1) of the second data 120. As such, the matching component 122 may determine that the portion 116(1) of the first data 110 corresponds to the portion 116(1) of the second data 120. Additionally, the matching component 122 may determine that the check value 124 associated with the portion 116(4) of the first data 110 matches the check value 124 associated with the portion 116(4) of the second data 120. As such, the matching component 122 may determine that the portion 116(4) of the first data 110 corresponds to the portion 116(4) of the second data 120. Furthermore, the matching component 122 may determine that the check value 124 associated with the portion 116(6) of the first data 110 matches the check value 124 associated with the portion 116(6) of the second data 120. As such, the matching component 122 may determine that the portion 116(6) of the first data 110 corresponds to the portion 116(6) of the second data 120.

For a second example, and in addition to, or alternatively from, utilizing CRC, the matching component 122 may utilize SHA-1 to generate first hash values 124 associated with the portions 116(1)-(6) of the first data 110 and second hash values 124 associated with the portions 116(1), 116(4), 116(6), and 116(7)-(9) of the second data 120. The matching component 122 may then compare the first hash values 124 to the second hash values 124 to identify portion(s) of the first data 110 that correspond to portion(s) of the second data 120.

For instance, and as shown in the example of FIG. 1, the matching component 122 may determine that the hash value 124 associated with the portion 116(1) of the first data 110 matches the hash value 124 associated with the portion 116(1) of the second data 120. As such, the matching component 122 may determine that the portion 116(1) of the first data 110 corresponds to the portion 116(1) of the second data 120. Additionally, the matching component 122 may determine that the hash value 124 associated with the portion 116(4) of the first data 110 matches the hash value 124 associated with the portion 116(4) of the second data 120. As such, the matching component 122 may determine that the portion 116(4) of the first data 110 corresponds to the portion 116(4) of the second data 120. Furthermore, the matching component 122 may determine that the hash value 124 associated with the portion 116(6) of the first data 110 matches the hash value 124 associated with the portion 116(6) of the second data 120. As such, the matching component 122 may determine that the portion 116(6) of the first data 110 corresponds to the portion 116(6) of the second data 120.

In some examples, the matching component 122 further identifies the unique portion(s) of the second data 120. For instance, and as shown in the example of FIG. 1, the matching component 122 may determine that the check values 124 and/or the hash values 124 associated with the portions 116(7)-(9) of the second data 120 do not match the check values 124 and/or the hash values 124 associated with the portions 116(1)-(7) of the first data 110. As such, the matching component 122 may determine that the portions 116(7)-(9) of the second data 120 includes unique portions. In some examples, when the electronic devices 112(1)-(3) update the file, the remote system 102 may send to the unique portions 116(7)-(9) of the second data 120 to the electronic device 112(1)-(3) along with data representing a manifest 118. The manifest 116 may define an order for generating the second version 106 of the file by reassembling the portions 116(1), 116(4), 116(6) of the first data 110 already stored on the electronic devices 112(1)-(3) and the unique portions 116(7)-(9) of the second data 120.

However, in some examples, a unique portion of the second data 120 may be similar enough to one of the portions 116(1)-(6) of the first data 110 that the unique portion of the second data 120 can be converted to the portion 116(1)-(6) of the first data 120 with minimal instructions. For example, the difference between the unique portion of the second data 120 and the portion 116(1)-(6) of the first data 110 may include one or more bytes of data that were added to, removed from, or changed within the portion 116(1)-(6) of the first data 110. As such, before and/or instead of sending unique portions 116(7)-(9) of the second data 120 to the electronic devices 112(1)-(3), the remote system 102 may initially determine whether the unique portions 116(7)-(9) can be converted to one of the portions 116(1)-(6) of the first data 110. Based on determining that a unique portion of the second data 120 can be converted to a portion 116(1)-(6) of the first data 110, the remote system 102 may generate data representing instructions for converting the unique portion of the second data 120 into the portion 116(1)-(6) of the first data 110. The remote system 102 may then perform a similar process for other unique portion(s) that can be converted to portions 116(1)-(6) of the first data 110. Using this data, the remote system 102 may generate a patch file 126 and send the patch file 126 to the electronic devices 112(1)-(3).

For example, the matching component 122 may identify that the portion 116(4) of the first data 110 corresponds to the portion 116(4) of the second data 120. The matching component 122 may then use the similarity to identify a portion (e.g., unique portion) of the second data 120 that may be converted to a portion of the first data 110. In some examples, the matching component 122 identifies the portion of the second data 120 as a "neighbor" to the portion 116(4) of the second data 120 and identifies the portion of the first data 110 as a "neighbor" to the portion 116(4) of the first data 110. For a first example, the matching component 122 may identify the portion 116(8) of the second data 120 that precedes the portion 116(4) of the second data 120 and the portion 116(3) of the first data 110 that precedes the portion 116(4) of the first data 110. For a second example, the matching component 122 may identify the portion 116(9) of the second data 120 that is subsequent to the portion 116(4) of the second data 120 and the portion 116(5) of the first data 110 that is subsequent to the portion 116(4) of the first data 110.

The remote system 102 may then generate data representing a difference between the identified portion of the second data 120 and the identified portion of the first data 110. Based on determining that the difference does not satisfy a threshold 130, the remote system 102 may determine that the identified portion of the second data 120 is not similar to the identified portion of the first data 110. However, based on determining that the difference satisfies the threshold difference, the remote system 102 may determine that the identified portion of the second data 120 is similar to the identified second portion of the first data 110. The remote system 102 may then store the data representing the difference in the patch file 126 for the second version 106 of the file.

In some examples, the remote system 102 may use compression to determine if the identified portion of the second data 120 is similar to the identified portion of the first data 110. For example, and using the subsequent portions of the first data 110 and the second data 120, the remote system 102 may utilize a compression component 128 to compress the portion 116(5) of the first data 110 and the portion 116(9) of the second data. For instance, the compression component 128 may use algorithm(s) (e.g., LZMA, LZW, BTLZ, LZ77, LZ78 etc.) to compress the portion 116(5) of the first data 110. Based on the compression, the compression component 128 may generate first compressed data for the portion 116(5) of the first data 110. The compression component 128 may further use the algorithm(s) to compress the portion 116(9) of the second data 120. Based on the compression, the compression component 128 may generate second compressed data for the portion 116(9) of the second data 120. Additionally, the compression component 128 may use the algorithm(s) and the first compressed data to again compress the portion 116(9) of the second data 120. For instance, the compression component 128 may use the first compressed data as a base to generate the third compressed data, where the third compressed data represents a difference between the portion 116(5) of the first data 110 and the portion 116(9) of the second data 120.

The remote system 102 may then determine a difference between second compressed data and the third compressed data. The analysis component 136 may then determine if the difference satisfies a threshold difference. For a first example, the analysis component 136 may determine a size difference between the second compressed data the third compressed data. The analysis component 136 may then determine if the size difference satisfies a size threshold. For instance, if the size difference is 0.5 megabytes, and the size threshold is 0.75 megabytes, then the analysis component 136 may determine that the size difference satisfies (e.g., is within) the size threshold. For a second example, the analysis component 136 may determine a ratio (e.g., a difference) of the size of the third compressed data to the size to the second compressed data. The analysis component 136 may then determine if the ratio satisfies a threshold. For instance, if the second compressed data includes a size of 0.5 megabytes and the third compressed data includes a size of 0.8 megabytes, then the analysis component 136 may determine that the ratio of the size of the second compressed data to the size of the second compressed data is 0.625. If the threshold includes 0.8, then the analysis component 136 may determine that the ratio satisfies (e.g., is within) the threshold. For example, the analysis component 136 may determine that the ratio of 0.625 is within (e.g., less than) the threshold of 0.8. In some examples, the smaller the ratio, the more similar the second portion of the second data 120 is to the second portion of the first data 110.

In some examples, the compressed data may include a dictionary and/or a reference. For instance, the compression component 128 may use the algorithm(s) (e.g., LZMA, LZW, BTLZ, LZ77, LZ78 etc.) to compress the portion 116(5) of the first data 110. Based on the compression, the compression component 128 may generate a first dictionary 132 and a first reference 134 (e.g., a first sequence of symbols and phrase references). The compression component 128 may further use the algorithm(s) to compress the portion 116(9) of the second data 120. Based on the compression, the compression component 128 may generate a second dictionary 132 and a second reference 134 (e.g., a second sequence of symbols and phrase references). Additionally, the compression component 128 may use the algorithm(s) and the first dictionary 132 to again compress the portion 116(9) of the second data 120. For instance, the compression component 128 may use the first dictionary 132 as a base to initially populate a third dictionary 132. The compression component 128 may then add additional data to the third dictionary, where the additional data represents the difference between the portion 116(5) of the first data 110 and the second portion 116(9) of the second data 120. Furthermore, the compression component 128 may generate the third reference 134 (e.g., a third sequence of symbols and phrase references) for the third dictionary 132.

The remote system 102 may then utilize an analysis component 136 determine a difference between second dictionary 132 and the third dictionary 132. The analysis component 136 may then determine if the difference satisfies the threshold 130. For a first example, the analysis component 136 may determine a size difference between the second dictionary 132 and the third dictionary 132. The analysis component 136 may then determine if the size difference satisfies a size threshold 130. The size threshold 130 may include, but is not limited to, 100 bytes, 250 bytes, 500 bytes, 1 megabyte, and/or any other size. For instance, if the size difference between the second dictionary 132 and the third dictionary 132 is 0.5 Megabytes, and the size threshold is 0.75 Megabytes, then the analysis component 136 may determine that the size difference satisfies (e.g., is within) the size threshold 130.

For a second example, the analysis component 136 may determine a ratio (e.g., a difference) of the size of the third dictionary 132 to the size to the second dictionary 132. The remote system may then determine if the ratio satisfies a threshold 130. The threshold 130 may include, but is not limited to, 0.1, 0.2, 0.5, 0.8, and/or any other threshold. For instance, if the second dictionary 132 includes a size of 0.5 megabytes and the third dictionary 132 includes a size of 0.8 megabytes, then the remote system 102 may determine that the ratio of the size of the second dictionary 132 to the size of the second dictionary 132 is 0.625. If the threshold includes 0.8, then the remote system 102 may determine that the ratio satisfies (e.g., is within) the threshold. For example, the remote system 102 may determine that the ratio of 0.625 is within (e.g., less than) the threshold of 0.8

In some examples, the remote system 102 may utilize an update component 138 to generate the patch file 126 for the second version 106 of the file. For example, based on determining that the difference satisfies the threshold 130, the update component 138 may store conversion data 140 representing the difference between the portion 115(9) of the second data 120 and the portion 115(5) of the first data 110. In some examples, the conversion data 140 may represent the difference between the third dictionary 132 and the first dictionary 132. Additionally, the update component 138 may store data representing the third reference 134 generated for the third dictionary 132.

In some examples, the remote system 102 may then perform similar processes for each of the other unique portions 116(7)-(8) of the second data 120. For instance, the remote system 102 may analyze the portion 116(8) of the second data 120 with respect to the portion 116(3) of the first data 110. During the analysis, the update component 138 may determine that the difference between the portion 116(8) of the second data 120 and the portion 116(3) of the first data 110 satisfies the threshold 130. Based on the determination, the update component 138 may store conversion data 140 representing the difference between the portion 116(8) of the second data 120 and the portion 116(3) of the first data 110 in the patch file 126. Additionally, the update component 138 may store data representing a fourth reference 134 (e.g., a fourth sequence of symbols and phrase references) for a fourth dictionary 132 generated by the compression component 128 for the portion 116(8) of the second data 120.

In some examples, the remote system 102 may determine that a unique portion of the second data 120 is not similar to one of the portions 116(1)-(6) of the first data 110. For example, the remote system 102 may analyze the portion 116(7) of the second data 120 with respect to the portion 116(2) of the first data 110. During the analysis, the update component 138 may determine that the difference between the portion 116(7) of the second data 120 with respect to the portion 116(2) of the first data 110 does not satisfy the threshold 130. In some examples, based on the determination, the update component 138 store portion data 142 representing the portion 116(7) of the second data 120 in the patch file 126. In some examples, the update component 138 may store data associating the portion 116(7) of the second data 120 with the second version 106 of the file.

The remote system 102 may then send, over the network 108, the patch file 126 to the electronic devices 112(1)-(3). In some examples, if the patch file 126 does not include the portion data 142, the remote system 102 may separately send the portion 116(7) of the second data 120 to the electronic device 112(1)-(3). The electronic devices 112(1)-(3) may then use the first data 110 for the first version 104 of the file, the patch file 126, and/or the dictionaries 132 associated with the portion 116(1)-(6) of the first data 110 to update the first version 104 of the file to the second version 106 of the file.

For example, the electronic device 112(1) may use the portions 116(1), 116(4), and 116(6) of the first data 110 that correspond to the portions 116(1), 116(4), 116(6) of the second data 120, where the portions 116(1), 116(4), and 116(6) of the first data 110 are already stored by the electronic device 112(1). Additionally, the electronic device 112(1) may use the dictionary 132 associated with the portion 116(3) of the first data 110, the conversation data 140 associated with the portion 116(8) of the second data 120, and/or the reference 134 associated with the portion 116(8) of the second data 120 to convert the portion 116(3) of the first data 110 to the portion 116(8) of the second data 120. Similarly, the electronic device 112(1) may use the dictionary 132 associated with the portion 116(5) of the first data 110, the conversation data 140 associated with the portion 116(9) of the second data 120, and/or the reference 134 associated with the portion 116(9) of the second data 120 to convert the portion 116(5) of the first data 110 to the portion 116(9) of the second data 120. Furthermore, the electronic device 112(1) may replace the portion 116(2) of the first data 110 with the portion 116(7) of the second data 120.

As further illustrated in FIG. 1, the remote system 102 may include processor(s) 144, network interface(s) 146, and memory 148, and the electronic device 112(1) may include processor(s) 150, network interface(s) 152, and memory 154. As used herein, a processor, such as processor(s) 144 and processor(s) 150, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 148 and the memory 154, may include volatile and nonvolatile memory, removable and non-removable media implemented in any method or technology for storage of information, such as computer-readable instructions, data structures, program component, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s), such as the network interface(s) 146 and the network interface(s) 152, may enable communications between the components and/or devices shown in environment 100 and/or with one or more other remote systems, as well as other networked devices. Such network interface(s) may include one or more network interface controllers (NICs) or other types of transceiver devices to send and receive communications over the network 108. For instance, each of the network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

Figure 2:
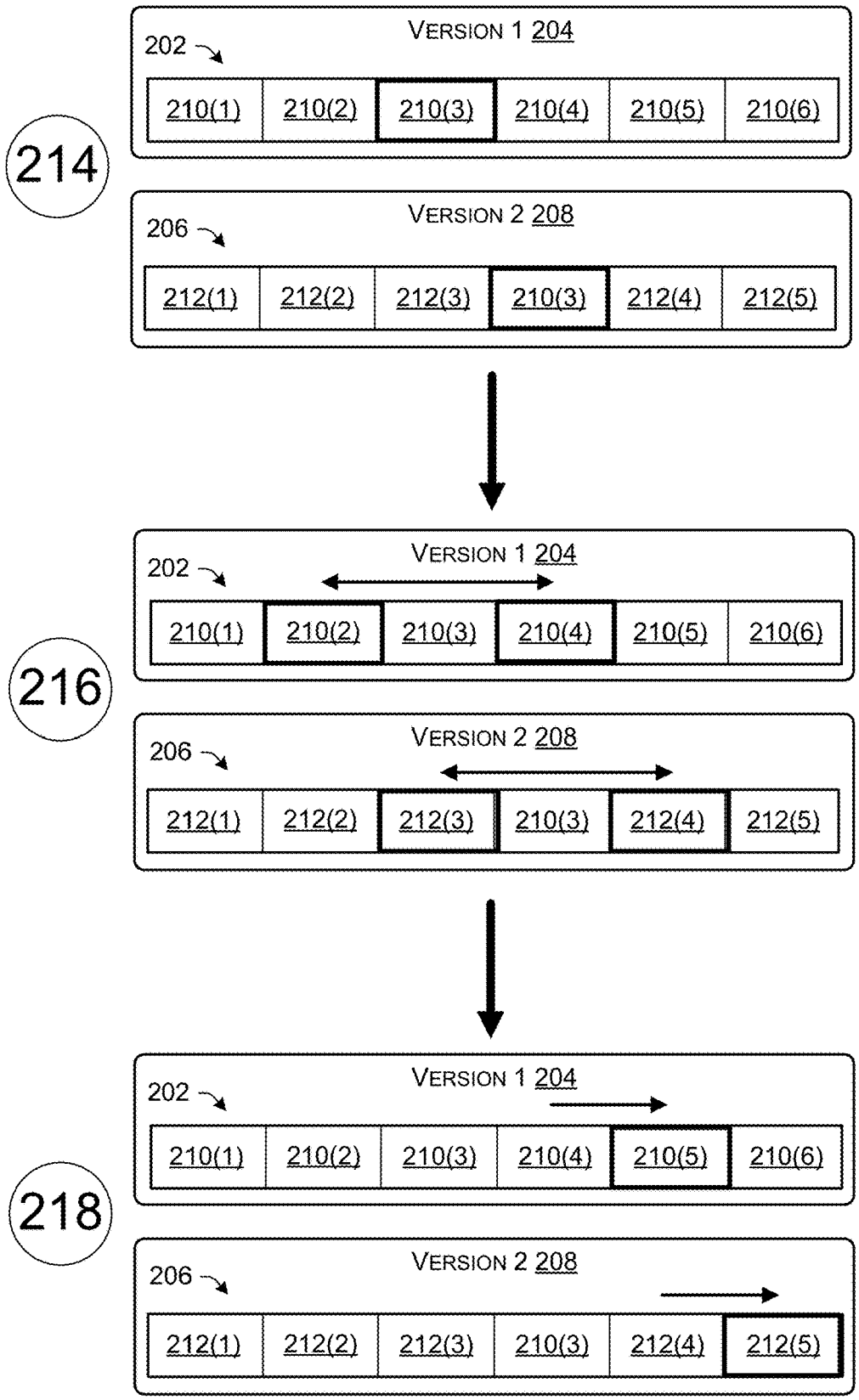
FIG. 2 is an example of identifying portions of first version of a file that may be similar to portions of second version of the file for generating a patch for updating instances of the first version to the second version of the file.

FIG. 2 is an example of identifying portions of first data 202 representing a first version 204 of file that may be converted to portions of second data 206 representing a second version 208 of the file. For example, the remote system 102 may analyze the portions 210(1)-(6) of the first data 202 with respect to the portions 210(3) and 212(1)-(5) of the second data 206 to identify portion(s) of the first data 202 that are similar to portion(s) of the second data 206. For instance, at process 214, the remote system 102 may initially identify that the portion 210(3) of the first data 202 corresponds to the portion 210(3) of the second data 206, using the processes described herein (e.g., CRC, SHA-1, etc.). The remote system 102 may then use the portion 210(3) of the first data 202 and the portion 210(3) of the second data 206 as "anchor" portions for identifying the portion(s) of the first data 202 that are similar to the portion(s) of the second data 206.

Next, at process 216, the remote system 102 may analyze the "neighbor" portions to the anchor portions to determine if the neighbor portions are similar to one another. For a first example, the remote system 102 may analyze the portion 210(2) of the first data 202 with respect to the portion 212(3) of the second data 206 to determine if the portion 210(2) of the first data 202 is similar to the portion 212(3) of the second data 206, using one or more of the processes described herein (e.g., LZMA, LZW, BTLZ, LZ77, LZ78 etc.). Additionally, the remote system 102 may analyze the portion 210(4) of the first data 202 with respect to the portion 212(4) of the second data 206 to determine if the portion 210(4) of the first data 202 is similar to the portion 212(4) of the second data 206, using one or more of the processes described herein (e.g., LZMA, LZW, BTLZ, LZ77, LZ78 etc.).

Next, at process 218, the remote system may continue to analyze the neighbor portions when the remote system 102 determines that two portions are similar to one another. For a first example, the remote system 102 may have determine that the portion 210(4) of the first data 202 is similar to the portion 212(4) of the second data 206 (e.g., the difference between the portion 210(4) of the first data 202 and the portion 212(4) of the second data 206 satisfies a threshold). Based on the determination, the remote system 102 may analyze the portion 210(5) of the first data 202 with respect to the portion 212(5) of the second data 206 to determine if the portion 210(5) of the first data 202 is similar to the portion 212(5) of the second data 206, using one or more of the processes described herein (e.g., LZMA, LZW, BTLZ, LZ77, LZ78 etc.).

For a second example, the remote system 102 may have determine that the portion 210(2) of the first data 202 is not similar to the portion 212(3) of the second data 206 (e.g., the difference between the portion 210(2) of the first data 202 and the portion 212(3) of the second data 206 does not satisfy the threshold). In some examples, and as illustrated in the example of FIG. 2, based on the determination, the remote system 102 may determine not to analyze the portion 210(1) of the first data 202 with respect to the portion 212(2) of the second data 206. However, in other examples, the remote system 102 may still analyze the portion 210(1) of the first data 202 with respect to the portion 212(2) of the second data 206 to determine if the portion 210(1) of the first data 202 is similar to the portion 212(2) of the second data 206, using one or more of the processes described herein (e.g., LZMA, LZW, BTLZ, LZ77, LZ78 etc.).

Figure 3:
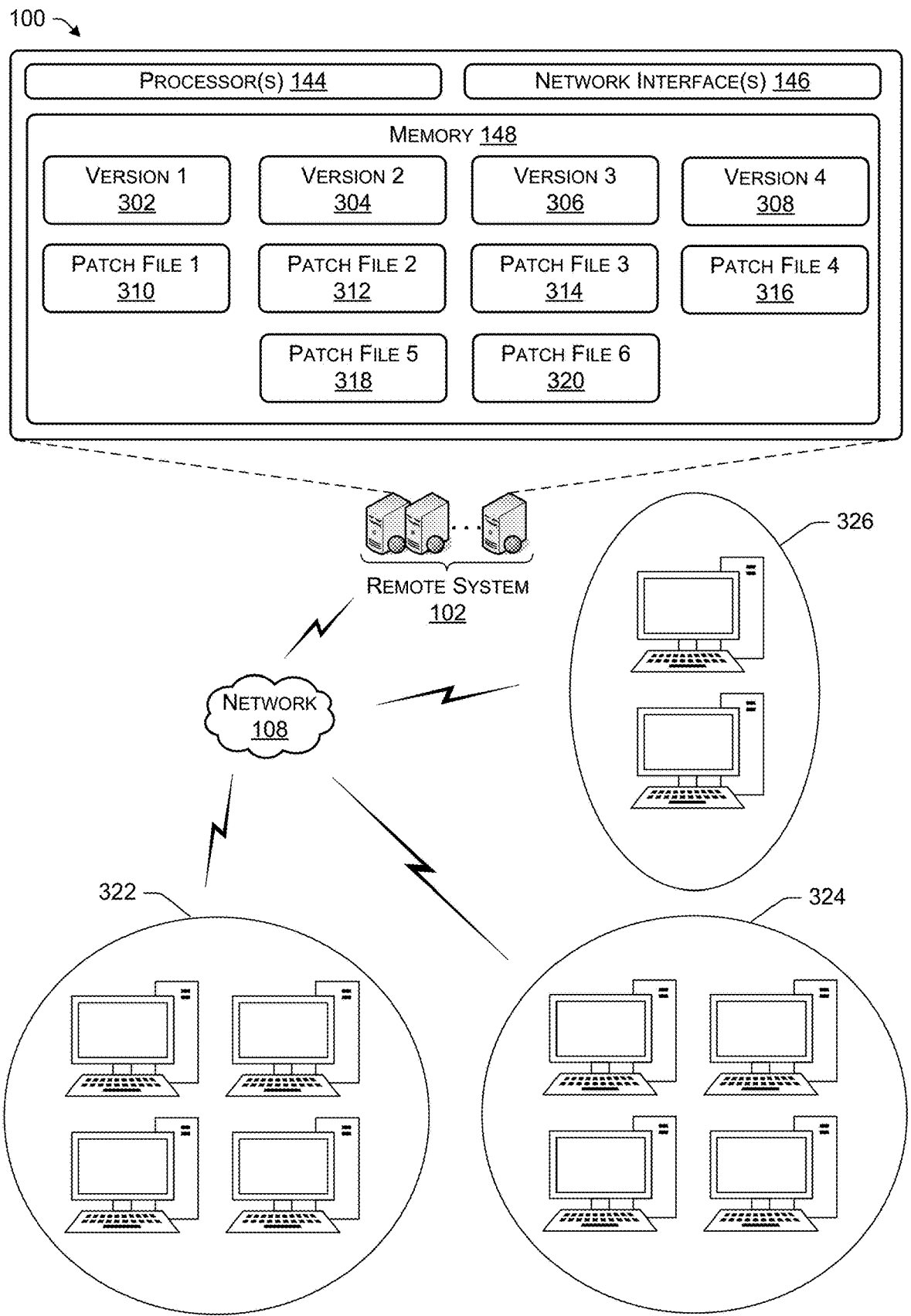
FIG. 3 is an example of a remote system configured to generate patch files for various version of a file.

FIG. 3 is an example of the remote system 102 generating patch files for various version of a file. For example, the remote system 102 may store a first version 302 of a file, a second version 304 of the file, a third version 306 of the file, and a fourth version 308 of the file. Using the processes described herein, the remote system 102 may generate a first patch file 310 for updating the first version 302 of the file to the second version 304 of the file, a second patch file 312 for updating the first version 302 of the file to the third version 306 of the file, a third patch file 314 for updating the first version 302 of the file to the fourth version 308 of the file, a fourth patch file 316 for updating the second version 304 of the file to the third version 306 of the file, a fifth patch file 318 for updating the second version 304 of the file to the fourth version 308 of the file, and/or a sixth patch file 320 for updating the third version 306 of the file to the fourth version 308 of the file.

The remote system 102 may then send the patch files 310-320 to electronic devices based on the current versions of the file stored on the electronic devices. For a first example, a first group of electronic devices 322 may be storing the third version 306 of the file. As such, the remote system 102 may send the first group of electronic devices 322 the sixth patch file 320 for updating the third version 306 of the file to the fourth version 308 of the file. Additionally, a second group of electronic devices 324 may be storing second version 304 of the file. As such, the remote system 102 may send the second group of electronic devices 324 the fifth patch file 318 for updating the second version 304 of the file to the fourth version 308 of the file. Furthermore, a third group of electronic devices 326 may be storing the first version 302 of the file. As such, the remote system 102 may send the third group of electronic devices 326 the first patch file 310 for updating the first version 302 of the file to the fourth version 308 of the file.

In some examples, alternatively from generating each of the patch files 310-320, the remote system 102 may generate patch files for the most popular updates of the file. For instance, in the example of FIG. 3, the first group of electronic devices 322 includes four electronic devices updating the third version 306 of the file to the fourth version 308 of the file, the second group of electronic devices 324 includes fourth electronic devices updating the second version 304 of the file to the fourth version 308 of the file, and the third group of electronic devices 326 includes two electronic devices updating the first version 302 of the file to the fourth version 308 of the file. As such, in some examples, the remote system 102 may only generate the fifth patch file 318 for updating the second version 304 of the file to the fourth version 308 of the file and the sixth patch file 320 for updating the third version 306 of the file to the fourth version 308 of the file since those are the most popular updates. However, since only two electronic devices are updating the first version 302 of the file to the fourth version 308 of the file, the remote system 102 may not generate the first patch file 310.

Figure 4A:
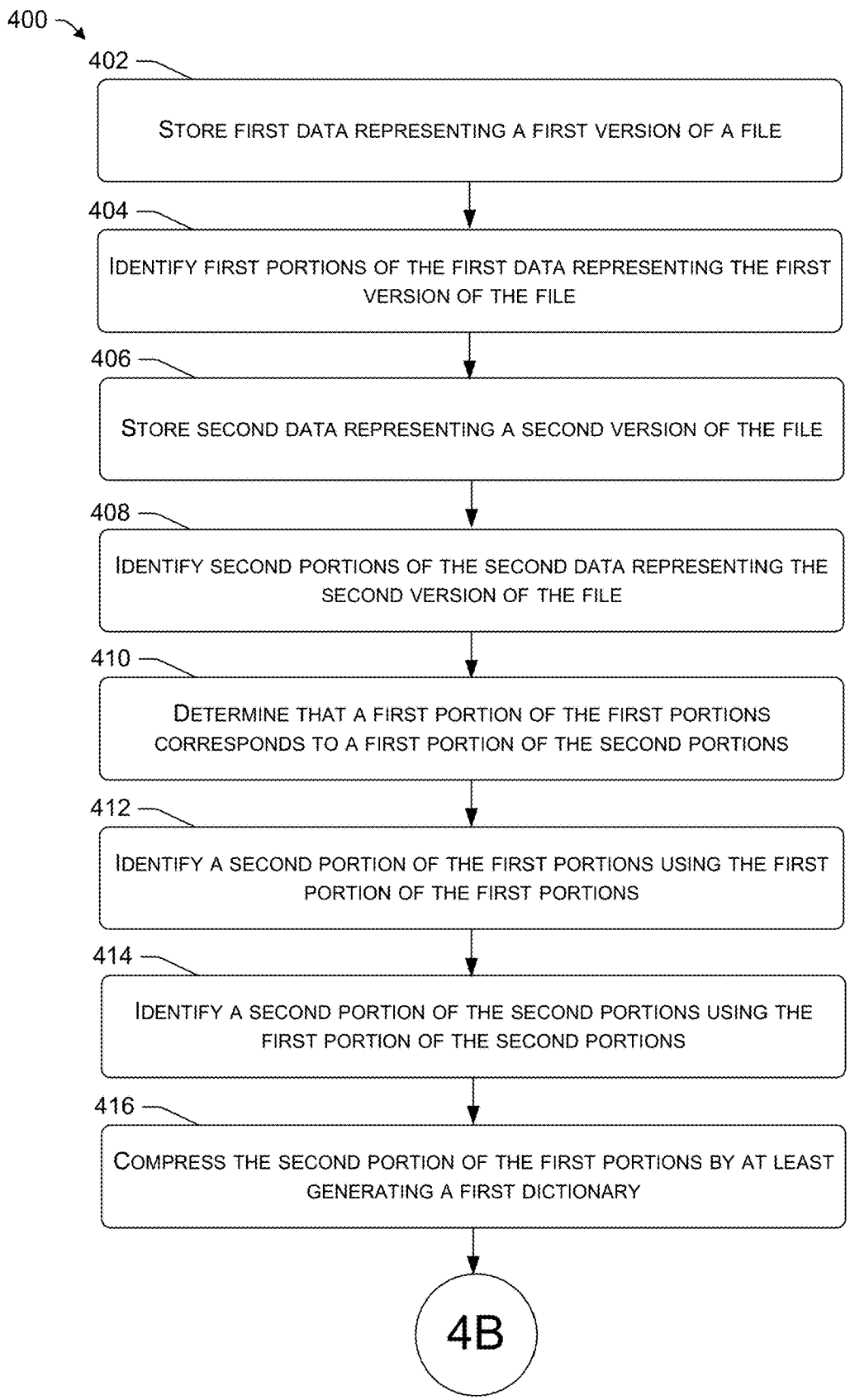
FIGS. 4A-4B are a flow diagram of an example process for generating data for updating a file from a first version to a second version.
Figure 4B:
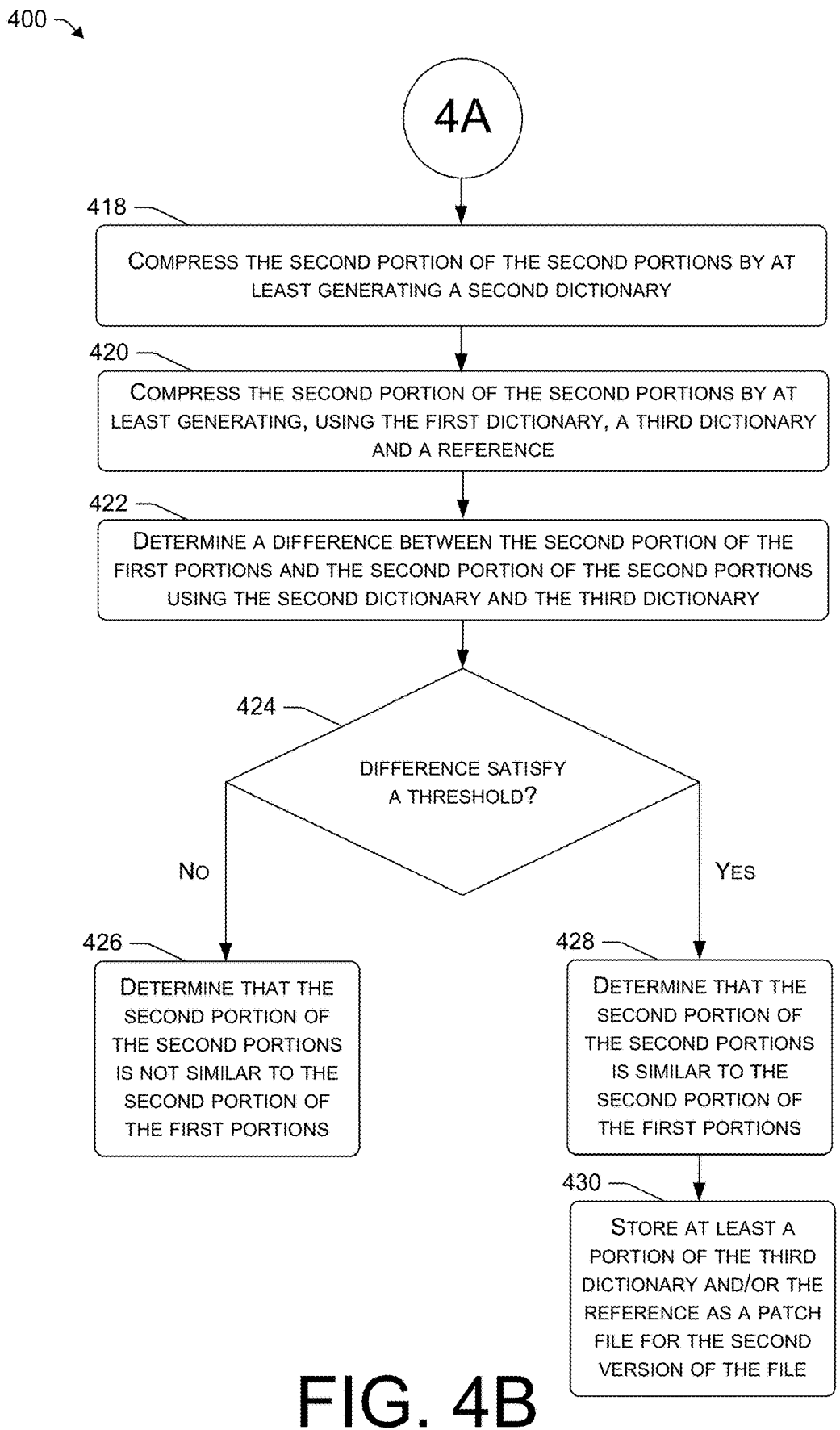

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes FIG. 4 is a flow diagram of an example process 400 for generating data for updating a file from a version of the file to a second version of the file. At 402, the process 400 may include storing first data representing a first version of a file. For example, the remote system 102 may store the first data representing the first data of the file. In some examples, the file may be associated with a game. In some examples, the remote system 102 may receive the first data from one or more computing devices associated with a developer of the file.

At 404, the process 400 may include identifying first portions of the first data representing the first version of the file. For example, the remote system 102 may identify the first portions of the first data representing the first version of the file. The first portions of the first data may include contiguous sections of the first data. For example, the first portions of the first data may include, but are not limited to, 500 byte contiguous sections of the first data, 1 megabyte contiguous sections of the first data, 5 megabyte contiguous sections of the first data, and/or the like.

At 406, the process 400 may include storing second data representing a second version of the file. For example, the remote system 102 may store the second data representing the second version of the file. In some examples, to generate the second data, data may have been added to the first data, removed from the first data, changed within the first data, and/or the like. In some examples, the remote system 102 may receive the second data from the one or more computing devices associated with a developer of the file.

At 408, the process 400 may include identifying second portions of the second data representing the second version of the file. For example, the remote system 102 may identify the second portions of the second data representing the second version of the file. The second portions of the second data may include contiguous sections of the second data. For example, the second portions of the second data may include, but are not limited to, 500 byte contiguous sections of the second data, 1 megabyte contiguous sections of the second data, 5 megabyte contiguous sections of the second data, and/or the like. In some examples, the second portions of the second data may include a similar size as the first portions of the first data.

At 410, the process 400 may include determining that a first portion of the first portions corresponds to a first portion of the second portions. For examples, the remote system 102 may determine that the first portion of the first portions corresponds to the first portion of the second portions. In some examples, to make the determination, the remote system 102 may use CRC to determine a first check value for the first portion of the first portions and a second check value for the first portion of the second portions. The remote system 102 may then determine that the first check value is the same as the second check value. In some examples, to make the determination, the remote system 102 may use SHA-1 to determine a first hash value for the first portion of the first portions and a second hash value for the first portion of the second portions. The remote system 102 may then determine that the first hash value is the same as the second hash value.

At 412, the process 400 may include identifying a second portion of the first portions using the first portion of the first portions. For example, the remote system 102 may identify the second portion of the first portions using the first portion of the first portions. In some examples, the remote system 102 may identify the second portion of the first portions as a portion of the first data that is subsequent to the first portion of the first portions. In some examples, the remote system 102 may identify the second portion of the first portions as a portion of the first data that precedes the first portion of the first portions.

At 414, the process 400 may include identifying a second portion of the second portions using the first portion of the second portions. For example, the remote system 102 may identify the second portion of the second portions using the first portion of the second portions. In some examples, the remote system 102 may identify the second portion of the second portions as a portion of the second data that is subsequent to the first portion of the second portions. In some examples, the remote system 102 may identify the second portion of the second portions as a portion of the first data that precedes the first portion of the second portions.

At 416, the process 400 may include compressing the second portion of the first portions by at least generating a first dictionary. For example, the remote system 102 may compress the second portion of the first portions by at least generating the first dictionary. In some examples, the remote system 102 compresses the second portion of the first portions using one or more algorithm associated with one or more compression techniques (e.g., LZMA, LZW, BTLZ, LZ77, LZ78 etc.). In some examples, the remote system 102 compresses the second portion of the first portions using one or more other compression techniques.

At 418, the process 400 may include compressing the second portion of the second portions by at least generating a second dictionary. For example, the remote system 102 may compress the second portion of the second portions by at least generating the second dictionary. In some examples, the remote system 102 compresses the second portion of the second portions using one or more algorithm associated with one or more compression techniques (e.g., LZMA, LZW, BTLZ, LZ77, LZ78 etc.). In some examples, the remote system 102 compresses the second portion of the second portions using one or more other compression techniques.

At 420, the process 400 may include compressing the second portion of the second portions by at least generating, using the first dictionary, a third dictionary and a reference. For example, the remote system 102 may compress the second portion of the first portions by at least generating the third dictionary and the reference using the first dictionary. For instance, the remote system 102 may use the first dictionary as a base. The remote system 102 may then add additional data, based on the first data included in the second portion of the second portions, additional data to the first dictionary in order to generate the third dictionary. In some examples, the remote system 102 compresses the second portion of the second portions using one or more algorithms associated with one or more compression techniques (e.g., LZMA, LZW, BTLZ, LZ77, LZ78 etc.). In some examples, the remote system 102 compresses the second portion of the second portions using one or more other compression techniques.

At 422, the process 400 may include determining a difference between the second portion of the first portions and the second portion of the second portions using the second dictionary and the third dictionary. For example, the remote system 102 may determine the difference between the second portion of the first portions and the second portion of the second portions using the second dictionary and the third dictionary. In some examples, the remote system 102 may determine the difference as a size difference between the second dictionary and the third dictionary. In some examples, the remote system 102 may determine the difference as a ratio between the second dictionary and the third dictionary.

At 424, the process 400 may include determining whether the difference satisfies a threshold. For example, the remote system 102 may determine whether the difference satisfies the threshold difference. In some examples, when the difference includes the size difference, the remote system 102 may determine that the size difference satisfies the threshold when the size difference is within a size threshold. In some examples, when the difference includes a ratio, the remote system 102 may determine that the size difference satisfies the threshold when the ratio is within a ratio threshold.

If, at 424 it is determined that the difference does not satisfy the threshold, then at 426, the process 400 may include determining that the second portion of the second portions is not similar to the second portion of the first portions. For example, if the remote system 102 determines that the difference does not satisfy the threshold, then the remote system 102 may determine that the second portion of the second portions is not similar to the second portion of the first portions. Additionally, in some examples, when the remote system 102 receives a request from an electronic device to update the first version of the file to the second version of the file, the remote system 102 may send, to the electronic device, the second portion of the second portions.

If, at 424 it is determined that the difference satisfies the threshold, then at 428, the process 400 may include determining that the second portion of the second portions is similar to the second portion of the first portions. For example, if the remote system 102 determines that the difference satisfies the threshold, then the remote system 102 may determine that the second portion of the second portions is similar to the second portion of the first portions.

At 430, the process 400 may include storing at least a portion of the third dictionary and/or the reference as a patch file for the second version of the file. For example, the remote system 102 may store the at least the portion of the third dictionary and the reference as a patch file for the second version of the file. Additionally, in some examples, when the remote system 102 receives a request from an electronic device to update the first version of the file to the second version of the file, the remote system 102 may send, to the electronic device, the patch file rather than the second portion of the second portions.

In some examples, the remote system 102 may perform at least 410-430 for additional portions of the first data and the second data. Additionally, based on determining that additional portion(s) of the second data are similar to additional portion(s) of the first data, the remote system 102 may continue to add data to the patch file for the second version of the file.

FIG. 5 is a flowchart of an example process 500 for identifying a portion of first data that is similar to a portion of second data. At 502, the process 500 may include storing first data representing a first version of a file. For example, the remote system 102 may store the first data representing the first data of the file. In some examples, the file may be associated with a game. In some examples, the remote system 102 may receive the first data from one or more computing devices associated with a developer of the file.

At 504, the process 500 may include storing second data representing a second version of the file. For example, the remote system 102 may store the second data representing the second version of the file. In some examples, to generate the second data, data may have been added to the first data, removed from the first data, changed within the first data, and/or the like. In some examples, the remote system 102 may receive the second data from the one or more computing devices associated with a developer of the file.

At 506, the process 500 may include determining that a first portion of the first data corresponds to a first portion of the second data. For examples, the remote system 102 may determine that the first portion of the first data corresponds to the first portion of the second data. In some examples, to make the determination, the remote system 102 may use CRC to determine a first check value for the first portion of the first data and a second check value for the first portion of the second data. The remote system 102 may then determine that the first check value is the same as the second check value. In some examples, to make the determination, the remote system 102 may use SHA-1 to determine a first hash value for the first portion of the first data and a second hash value for the first portion of the second data. The remote system 102 may then determine that the first hash value is the same as the second hash value.

At 508, the process 500 may include identifying a second portion of the first data using the first portion of the first data. For example, the remote system 102 may identify the second portion of the first data using the first portion of the first data. In some examples, the remote system 102 may identify the second portion of the first data as a portion of the first data that is subsequent to the first portion of the first data. In some examples, the remote system 102 may identify the second portion of the first data as a portion of the first data that precedes the first portion of the first data.

At 510, the process 500 may include identifying a second portion of the second data using the first portion of the second data. For example, the remote system 102 may identify the second portion of the second data using the first portion of the second data. In some examples, the remote system 102 may identify the second portion of the second data as a portion of the second data that is subsequent to the first portion of the second data. In some examples, the remote system 102 may identify the second portion of the second data as a portion of the first data that precedes the first portion of the second data.

At 512, the process 500 may include generating third data representing a difference between the second portion of the second data and the second portion of the first data. For example, the remote system 102 may generate the third data representing the difference between the second portion of the second data and the second portion of the first data. In some examples, the difference may include a portion of a dictionary generated for the second portion of the second data, where the dictionary is generated using a dictionary associated with the second portion of the first data. In some examples, the difference may include a reference associated with a dictionary generated for the second portion of the second data.

At 514, the process 500 may include storing the third data in association with the file. For example, the remote system 102 may store the third data in association with the file. The third data may then be used to convert the second portion of the first data to the second portion of the second data.

Figure 6:
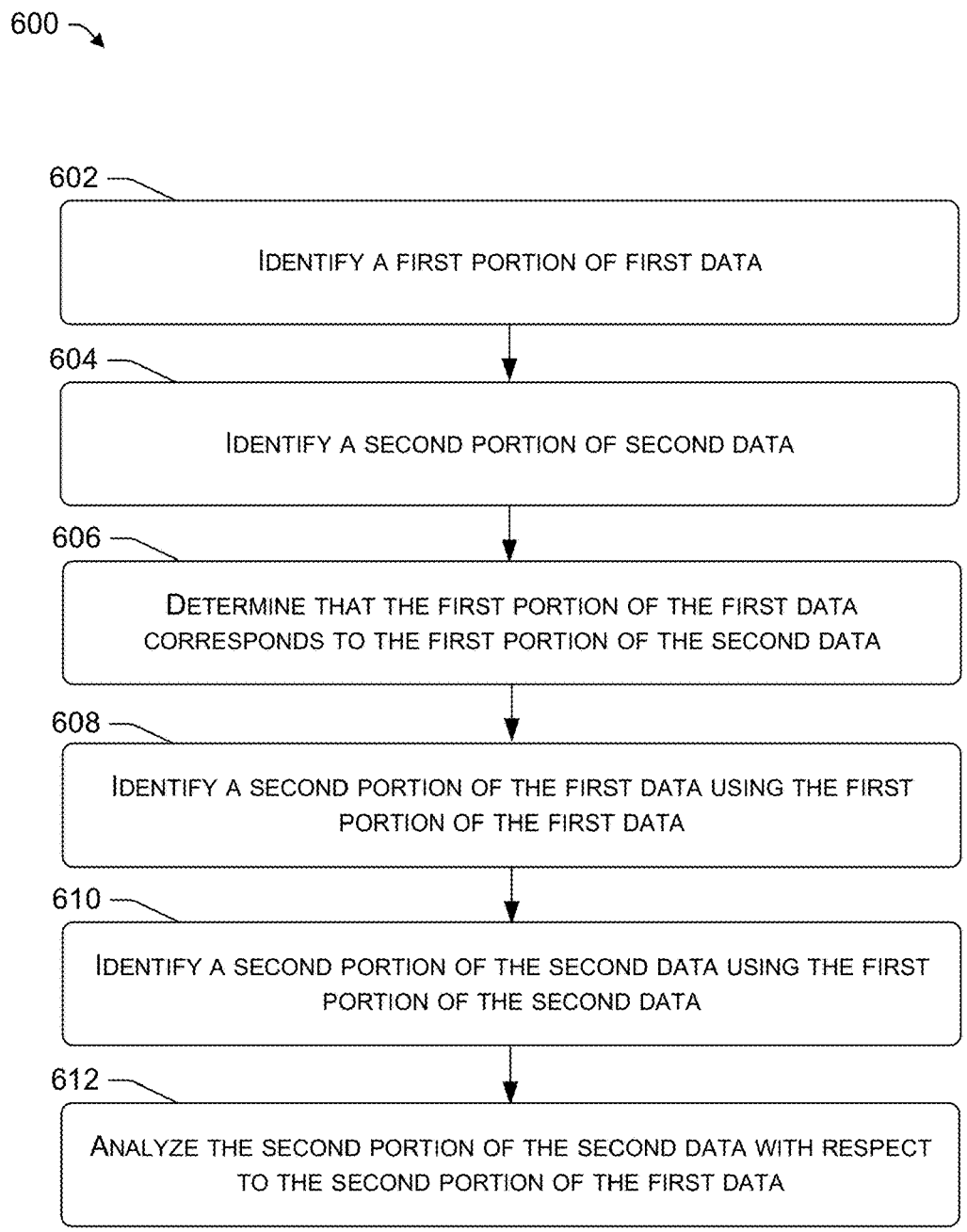
FIG. 6 is a flowchart of a second example process for identifying a portion of first data that is similar to a portion of second data.

FIG. 6 is a flowchart of a second example process 600 for identifying a portion of first data that is similar to a portion of second data. At 602, the process 600 may include identifying a first portion of first data. For example, the remote system 102 may identify the first portion of the first data. In some examples, the first data may represent a first version of a file. In some examples, the remote system 102 may receive the first data from one or more computing devices associated with a developer of the file.

At 604, the process 600 may include identifying a second portion of second data. For example, the remote system 102 may identify the second portion of the second data. In some examples, the second data may represent a second version of the file. For instance, to generate the second data, data may have been added to the first data, removed from the first data, changed within the first data, and/or the like. In some examples, the remote system 102 may receive the second data from the one or more computing devices associated with a developer of the file.

At 606, the process 600 may include determining that the first portion of the first data corresponds to the first portion of the second data. For examples, the remote system 102 may determine that the first portion of the first data corresponds to the first portion of the second data. In some examples, to make the determination, the remote system 102 may use CRC to determine a first check value for the first portion of the first data and a second check value for the first portion of the second data. The remote system 102 may then determine that the first check value is the same as the second check value. In some examples, to make the determination, the remote system 102 may use SHA-1 to determine a first hash value for the first portion of the first data and a second hash value for the first portion of the second data. The remote system 102 may then determine that the first hash value is the same as the second hash value.

At 608, the process 600 may include identifying a second portion of the first data using the first portion of the first data. For example, the remote system 102 may identify the second portion of the first data using the first portion of the first data. In some examples, the remote system 102 may identify the second portion of the first data as a portion of the first data that is subsequent to the first portion of the first data. In some examples, the remote system 102 may identify the second portion of the first data as a portion of the first data that precedes the first portion of the first data.

At 610, the process 600 may include identifying a second portion of the second data using the first portion of the second data. For example, the remote system 102 may identify the second portion of the second data using the first portion of the second data. In some examples, the remote system 102 may identify the second portion of the second data as a portion of the second data that is subsequent to the first portion of the second data. In some examples, the remote system 102 may identify the second portion of the second data as a portion of the first data that precedes the first portion of the second data.

At 612, the process 600 may include analyzing the second portion of the second data with respect to the second portion of the first data. For example, the remote system 102 may analyze the second portion of the second data with respect to the second portion of the first data. In some examples, to perform the analysis, the remote system 102 may generate third data representing the difference between the second portion of the second data and the second portion of the first data. In some examples, the difference may include a portion of a dictionary generated for the second portion of the second data, where the dictionary is generated using a dictionary associated with the second portion of the first data. In some examples, the difference may include a reference associated with a dictionary generated for the second portion of the second data.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   determining, by a remote system, that a first portion of first data representing a first version of a file corresponds to a first portion of second data representing a second version of the file;
   determining, by the remote system, a first difference between a second portion of the second data and a second portion of the first data;
   determining, by the remote system, that the second portion of the second data is similar to the second portion of the first data based at least in part on the first difference satisfying a threshold difference;
   determining, by the remote system, a second difference between a third portion of the second data and a third portion of the first data;
   determining, by the remote system, that the third portion of the second data is not similar to the third portion of the first data based at least in part on the second difference failing to satisfy the threshold difference; and
   sending, by the remote system, and based at least in part on the first difference satisfying the threshold difference and the second difference failing to satisfy the threshold difference, a patch file to an electronic device with access to the first data, the patch file including:
      data for converting the second portion of the first data to the second portion of the second data; and
      the third portion of the second data.

2. The method of claim 1, wherein the first difference comprises one or more bytes of data that were added to, removed from, or changed within the second portion of the first data to generate the second portion of the second data.

3. The method of claim 1, further comprising:
   generating, by the remote system, a dictionary associated with the second portion of the second data,
   wherein the first difference is determined based at least in part on the dictionary.

4. The method of claim 3, wherein the dictionary is a third dictionary, the method further comprising:
   generating, by the remote system, a first dictionary associated with the second portion of the first data; and
   generating, by the remote system, a second dictionary associated with the second portion of the second data,
   wherein the third dictionary is generated using at least the first dictionary, and
   wherein the first difference is determined based on the second dictionary.

5. The method of claim 3, wherein the patch file includes at least a portion of the dictionary.

6. The method of claim 3, wherein the patch file includes a reference associated with the dictionary, and wherein the reference comprises a sequence of symbols and phrase references.

7. The method of claim 1, wherein the file is associated with a game.

8. The method of claim 1, wherein the patch file does not include the second portion of the second data.

9. A system comprising:
   one or more processors; and
   memory storing computer-executable instructions that, when executed by the one or more processors, cause the one or more processors to:
      determine that a first portion of first data representing a first version of a file corresponds to a first portion of second data representing a second version of the file;
      determine a first difference between a second portion of the second data and a second portion of the first data;
      determine that the second portion of the second data is similar to the second portion of the first data based at least in part on the first difference satisfying a threshold difference;
      determine a second difference between a third portion of the second data and a third portion of the first data;
      determine that the third portion of the second data is not similar to the third portion of the first data based at least in part on the second difference failing to satisfy the threshold difference; and
      send, based at least in part on the first difference satisfying the threshold difference and the second difference failing to satisfy the threshold difference, a patch file to an electronic device with access to the first data, the patch file including:
         data for converting the second portion of the first data to the second portion of the second data; and
         the third portion of the second data.

10. The system of claim 9, wherein the first difference comprises one or more bytes of data that were added to, removed from, or changed within the second portion of the first data to generate the second portion of the second data.

11. The system of claim 9, wherein the computer-executable instructions, when executed by the one or more processors, further cause the one or more processors to:
   generate a dictionary associated with the second portion of the second data,
   wherein the first difference is determined based at least in part on the dictionary.

12. The system of claim 11, wherein the dictionary is a third dictionary, and the computer-executable instructions, when executed by the one or more processors, further cause the one or more processors to:
   generate a first dictionary associated with the second portion of the first data; and
   generate a second dictionary associated with the second portion of the second data,
   wherein the third dictionary is generated using at least the first dictionary, and
   wherein the first difference is determined based on the second dictionary.

13. The system of claim 11, wherein the patch file includes at least a portion of the dictionary.

14. The system of claim 9, wherein the computer-executable instructions, when executed by the one or more processors, further cause the one or more processors to:
   identify the second portion of the first data using the first portion of the first data; and
   identify the second portion of the second data using the first portion of the second data.

15. The system of claim 9, wherein the patch file does not include the second portion of the second data.

16. The system of claim 9, wherein the file is associated with a game.

17. A method comprising:
    determining, by a remote system, a first difference between a first portion of second data representing a second version of a file and a first portion of first data representing a first version of the file;
    determining, by the remote system, that the first portion of the second data is similar to the first portion of the first data based at least in part on the first difference satisfying a threshold difference;
    determining, by the remote system, a second difference between a second portion of the second data and a second portion of the first data;
    determining, by the remote system, that the second portion of the second data is not similar to the second portion of the first data based at least in part on the second difference failing to satisfy the threshold difference;
    storing, by the remote system, and based at least in part on the first difference satisfying the threshold difference and the second difference failing to satisfy the threshold difference, a patch file that includes:
        data for converting the first portion of the first data to the first portion of the second data; and
        the second portion of the second data;
    determining, by the remote system, to update the first version of the file to the second version of the file on an electronic device with access to the first data; and
    sending, by the remote system, the patch file to the electronic device.

18. The method of claim 17, wherein the first difference comprises one or more bytes of data that were added to, removed from, or changed within the first portion of the first data to generate the first portion of the second data.

19. The method of claim 17, wherein the first difference is determined based at least in part on a dictionary associated with the first portion of the second data, and wherein the patch file includes at least a portion of the dictionary.

20. The method of claim 17, wherein the patch file does not include the first portion of the second data.

* * * * *